US012034569B2

(12) United States Patent
Jones et al.

(10) Patent No.: US 12,034,569 B2
(45) Date of Patent: Jul. 9, 2024

(54) GATEWAY FOR REMOTE PROVISIONING OF SOFTWARE

(71) Applicant: Wind River Systems, Inc., Alameda, CA (US)

(72) Inventors: Matt Jones, Portland, OR (US); Arlen Baker, Alameda, CA (US); Robert Williams Abele, Washington, DC (US); Robert Woolley, Ottawa (CA)

(73) Assignee: WIND RIVER SYSTEMS, INC., Alameda, CA (US)

( * ) Notice: Subject to any disclaimer, the term of this patent is extended or adjusted under 35 U.S.C. 154(b) by 0 days.

(21) Appl. No.: 17/446,657

(22) Filed: Sep. 1, 2021

(65) Prior Publication Data

US 2023/0062521 A1    Mar. 2, 2023

(51) Int. Cl.
*H04L 12/66* (2006.01)
*H04L 9/40* (2022.01)
*H04L 29/06* (2006.01)

(52) U.S. Cl.
CPC .......... *H04L 12/66* (2013.01); *H04L 63/0464* (2013.01); *H04L 63/0892* (2013.01)

(58) Field of Classification Search
CPC . H04L 12/66; H04L 63/0464; H04L 63/0892; H04L 29/06
See application file for complete search history.

(56) References Cited

U.S. PATENT DOCUMENTS

| 10,303,880 | B2* | 5/2019 | Hershman | G06F 21/57 |
| 11,537,405 | B2* | 12/2022 | Nguyen | G06F 21/575 |
| 2005/0188260 | A1* | 8/2005 | First | G06F 11/0748 714/25 |
| 2015/0193637 | A1* | 7/2015 | Booth | G06F 21/53 726/30 |
| 2016/0364570 | A1* | 12/2016 | Stern | G06F 21/575 |
| 2018/0183653 | A1* | 6/2018 | Chew | H04L 41/0654 |
| 2020/0319925 | A1* | 10/2020 | Clampitt, III | G06F 9/45558 |
| 2022/0391856 | A1* | 12/2022 | Anumulapally | G06Q 20/38215 |

* cited by examiner

*Primary Examiner* — Quazi Farooqui
(74) *Attorney, Agent, or Firm* — Fay Kaplun & Marcin, LLP

(57) ABSTRACT

A gateway device configured to receive, from an integrated development environment (IDE), a system configuration for a target device including application code for execution on the target device, the configuration being received via an encrypted network connection. The gateway device provisions the target device with the application code, receives, from the IDE, instructions via the encrypted network connection to execute the application code on the remote device and instructs the application code to execute on the remote device.

17 Claims, 3 Drawing Sheets

GATEWAY FOR REMOTE PROVISIONING OF SOFTWARE

BACKGROUND INFORMATION

An integrated development environment (IDE) may be used to develop applications for execution on an electronic device. In some situations, a programmer may execute a compiled application on the target electronic device to test the application on the device, while in other situations the programmer may execute the compiled application on an emulation of the target electronic device to test the application. The target device may be, e.g., a development board comprising a microprocessor and minimal support logic used to prototype the application. In some scenarios, the target device may be located remotely from the programmer.

A communication protocol such as trivial file transfer protocol (TFTP) may typically be used to transfer files to and/or receive files from the remote target device over an untrusted network such as the Internet. For example, TFTP may be used for target provisioning to transfer a configuration and firmware to the target device. However, TFTP and other communication protocols may lack robust security features and may be vulnerable to attack. In current practice, when vulnerable communication protocols such as TFTP are used, a separate virtual private network (VPN) or other network setup may be used to secure the communications. However, these security measures may be impractical or cumbersome in many situations.

SUMMARY

Some exemplary embodiments are related to a method performed at a gateway device. The method includes receiving, from an integrated development environment (IDE), a system configuration for a target device including application code for execution on the target device, the configuration being received via an encrypted network connection, provisioning the target device with the application code, receiving, from the IDE, instructions via the encrypted network connection to execute the application code on the remote device and instructing the application code to execute on the remote device.

Other exemplary embodiments are related to a gateway device having a first network interface configured to receive a system configuration for a target device including application code for execution on the target device, a second network interface and a processor configured to determine the system configuration for the target device, send provisioning information to the target device via the second network interface, wherein the provisioning information includes the application code, receive, via the first network interface, instructions execute the application code on the remote device and instruct, via the second network interface, the application code to execute on the remote device.

DETAILED DESCRIPTION

Figure 1:
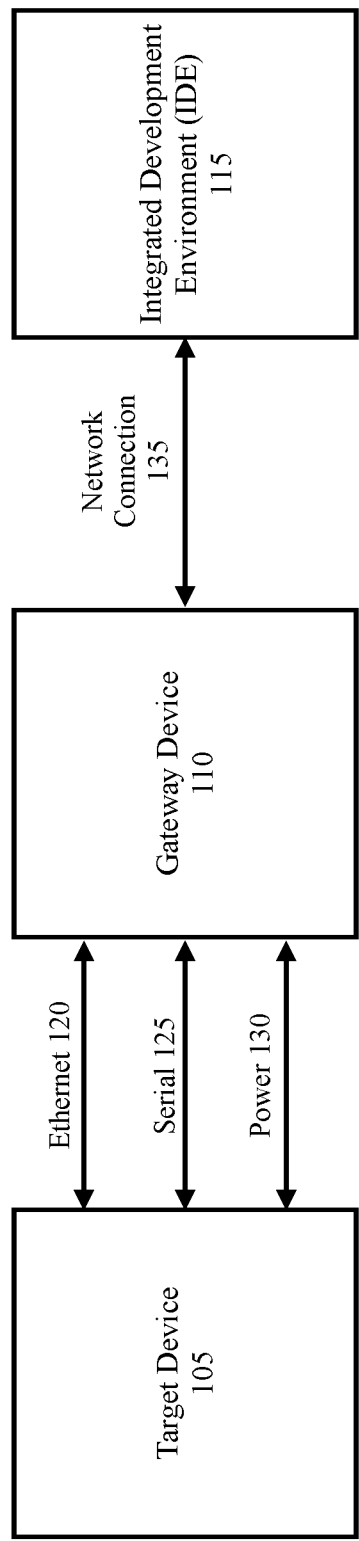
FIG. 1 shows an exemplary system diagram including a gateway device for providing secure access to a target device via an integrated development environment (IDE).

The exemplary embodiments may be further understood with reference to the following description and the related appended drawings, wherein like elements are provided with the same reference numerals. The exemplary embodiments are related to a device, a system, and a method for target provisioning of a target device, e.g., a development board, using a gateway device to secure the communications sent to and received from the target device.

The exemplary gateway device is configured with a secure one-to-one connection to the target device and serves as a conduit to/from the target device. The target device may be deployed for the testing/simulation of program code developed in an integrated development environment (IDE) and may be located remotely from a user of the IDE. The target device may be selected by the user and provisioned with application code pushed from the IDE, wherein secure communication protocols, such as mTLS, may be used to communicate the configuration from the IDE to the gateway device over an untrusted network, such as the Internet, while vulnerable communication protocols, such as TFTP, may be used to communicate the configuration from the gateway to the target device while remaining isolated from a customer network. The gateway device may function as an intermediary between the target device and the IDE so that target provisioning of a remote target device may be performed securely using such untrusted communications protocols while the target device remains isolated from attack.

An IDE may be considered a software application through which developers create, modify, test, store, etc., program code for various applications, to be explained in further detail below. The IDE includes various developer tools such as source code editing, local build automation, and debugging, combined into a single graphical user interface. In addition, the term "integrated development environment" ("IDE") as used herein may further encompass the system facilitating such software development, including, for example, cloud servers providing various services such as storage, application management services, device management services, etc. Further reference may be made to an "operator" of the IDE, which relates to the entity providing such services, relative to the "customer" of the IDE, which relates to an entity operating an instance of the IDE, e.g., in a private network such as that of a company. A "user" of the IDE may refer to a developer accessing the IDE (e.g., an instance of the IDE operated by the customer) via, for example, a client device executing the IDE software. Typically, the developers will write the general application in the IDE and then make specific alterations for the type of platform (e.g., operating system, device, etc.) of the target device and compile the application.

Throughout this description, the term "target provisioning" may refer to the remote configuration of a target device, e.g., a development board, for executing, testing and debugging application code. The term "target device" may refer to a physical board comprising hardware for running and debugging applications or may refer to a virtual board including hardware and virtual targets for a full-system simulator to simulate the hardware of complex electronic systems to test the applications written for the hardware. The target device may comprise a microprocessor and minimal support logic used to prototype the application. The target device (board) may be coupled to a device, e.g., a mechanical device, that is controlled by the board. For example, the board may be configured to operate a piece of mechanical hardware to simulate the operation of the hardware deployed in the field. However, this is only exemplary and in many use cases, additional hardware is not used. In some scenarios, the target device may be located remotely from a user/developer desiring to test code on the target device. The user may access the IDE via the client device, select a particular target device to use, and push the code to the device to test the code.

A communication protocol such as trivial file transfer protocol (TFTP) may be used to transfer files to and/or receive files from the remote target device over an untrusted network such as the Internet. For example, TFTP may be used for target provisioning to transfer a configuration and firmware to the target device. However, TFTP and other communication protocols may lack robust security features and may be vulnerable to attack. In current practice, when vulnerable communication protocols such as TFTP are used, a separate virtual private network (VPN) or other network setup may be used to secure the communications. However, these security measures may be impractical or cumbersome in many situations.

The exemplary gateway device may act as an intermediary between the target device and the IDE so that communications to/from the target device may be efficiently secured. According to one aspect of the present disclosure, a zero trust security architecture and a mutual transport layer security (mTLS) communication protocol is used by the IDE to secure the communications between the IDE and the gateway device.

Zero Trust security refers to a security model in which no aspect of communications between devices, including a user, a device, network traffic, etc., is trusted by default. The zero trust security model requires strict identity verification, regardless of whether the communicating devices are within a private network or a public network.

Mutual transport layer security (mTLS) is a communication protocol that may be used in a Zero Trust security framework. The mTLS protocol authenticates the entities, e.g., devices, servers, etc., at both ends of a network connection. TLS generally operates using public key encryption, wherein an encryption key is public and separate from a decryption key, which is private. In a public key cryptographic system, a user can encrypt a message using the public key of the receiver, wherein the receiver can decrypt the message only by using the private key known only to the receiver.

In mTLS, both communicating entities possess a distinct private key and a TLS certificate including information for identity verification. The mTLS authentication process may include a first device presenting its TLS certificate to a second device, the second device verifying the certificate of the first device, the second device presenting its TLS certificate to the first device, and the first device verifying the certificate of the second device. After this authentication process, the devices may exchange information over the encrypted TLS connection. A certificate authority (CA) manages and issues the certificates/keys. In the exemplary embodiments described herein, the CA may refer to the operator of the IDE. However, other entities may also act as a CA.

Throughout this description, reference may be made to an "image" being pushed to and/or installed by a device, e.g., the gateway device or the target device. The term "image" relates to a kernel and an operating system built from source code. Source code may represent the fundamental component of a program, an application, etc. The source code may be compiled to generate object code that may be used to execute the program on a processor. A build server may create a binary image representative of the source code.

A build server may be used to compile and assemble a binary image of source code corresponding to a computing program. After compiling the source code to generate the binary image, a signing service may append an authentication mark (e.g., a signature) that is indicative of a claim of the authenticity of the binary image. The binary image may then be used with subsequent secure processes to ensure that a device using the program loads only trusted binary images. For example, the secure process may be a secure boot sequence involving a hardware driven authentication mechanism to cryptographically verify the binary image prior to allowing a boot process to proceed. The binary image may also be used for manual verification of authenticity.

According to some embodiments, the exemplary gateway device comprises a separate physical device that may be directly connected to the target device and allows a user of the IDE to access and provision the target device, to be explained in further detail below. In other embodiments, a gateway may be integrated with the target device as software and have a reduced set of capabilities relative to the exemplary physical gateway device, also to be explained in further detail below.

FIG. 1 shows an exemplary system diagram 100 including a gateway device 110 for providing secure access to a target device 105 via an integrated development environment (IDE) 115. The target device 105 may be, for example, a development board that may be configured with software/firmware developed in the IDE 115, as described above. The IDE may represent an instance of a cloud-based IDE 115, to be described in further detail below with respect to FIG. 3.

The gateway 110 includes a central processing unit (CPU) and a kernel comprising a board support package (BSP) to boot and install a gateway operating system (OS). For example, the gateway 110 may include a Wind River Linux LTS21 BSP. The gateway 110 may further include security protocols, such as Secure Boot, to prevent malware from running prior to the booting of the OS, and/or Trusted Platform Module (TPM), to provide secure storage of certificates and encryption keys, to be explained in further detail below. The gateway OS may support any type of target device 105.

The gateway 110 is equipped with a first network interface controller (NIC) to communicate with the target device 105 via an Ethernet connection 120. The gateway 110 is further equipped with a serial port and hardware for communicating with the target device 105 via a serial connection 125. For example, the gateway 110 may include a universal asynchronous receiver-transmitter (UART) compliant with the RS-232 serial communication standard. In another example, the gateway 110 may include an inter-integrated circuit (I2C) or a serial peripheral interface bus (SPI) for synchronous serial communication. Those skilled in the art will understand that the gateway 110 may include any number of connections that may be used to communicate with the target device 105, including proprietary connections.

The gateway 110 is further equipped with another NIC to communicate with the IDE 115 over a network connection 135, such as the Internet. As noted above, the network connection 135 may be over an untrusted network. To secure the communications over the untrusted network, the network connection 135 between the gateway 110 and the IDE 115 may be configured with a mutual transport layer security (mTLS) encryption protocol in a zero trust security architecture, as discussed above. Thus, the gateway 110 and the IDE 115 may authenticate themselves to one another and perform communications over the encrypted mTLS connection.

The gateway 110 may also include a secure digital (SD) card as a primary storage for its OS and cryptographic keys for encrypting/decrypting communications with the IDE 115. In some embodiments, the gateway 110 may further include universal serial bus (USB) hardware. The gateway 110 may be configured as a USB host for the target device 105, wherein the USB provides a secondary storage, e.g., for diagnostic information received from the target device 105, and/or as a USB device for the target device 105, wherein the USB is used for debugging the application code executed on the target device 105.

The gateway 110 may further include a power relay for controlling a power flow 130 to the target device 105. The target device 105 may be power cycled by the gateway 110 via commands received from a user via the IDE 115, for example to bring up a powered-off target device 105 or as an aspect of testing the execution of the application code configured on the target device 105.

The direct connections between the gateway device 110 and the target device 105 allow for direct communications between the devices. Although an insecure protocol (TFTP) is used between the gateway device 110 and the target device 105, the insecure protocol is isolated from the IDE 115 (e.g. customer network) and is constrained to a network including only the gateway 110 and the target device 105, while zero trust principles are used between the gateway 110 and the IDE 115 to communicate over the wider network. The direct one-to-one connections allow for enriched communications between the devices. In one example, using the power connection 130, the target device 105 may be power cycled via the gateway device 110 and brought up from a powered off state. The gateway device 110 may power a new board, having no software previously loaded, and load the board with software, e.g., software agents to perform a variety of tasks, prior to any provisioning of the board. For example, a software agent may be deployed to perform diagnostic scans to determine the capabilities of the board.

Further direct connections (not shown) may be made between the gateway device 110 and the target device 105. For example, an HDMI connection may be made between the devices so that an HDMI feed can be received off the target device 105. Further examples of ways in which the direct connections can be leveraged for communications with the target device 105 will be explained in detail further below.

From the perspective of the IDE 115, the gateway 110 and the target device 105 are treated as untrusted devices. The operator of the IDE 115 may verify everything that is sent from the gateway 110 and may strictly control what is sent from the IDE 115 to the gateway 110.

Because the gateway 110 is a piece of physical hardware that may be outside of the direct control of the IDE 115, it must be assumed that gateways 110 may be lost or stolen. Therefore, it may be assumed that adversaries having physical access to the gateway 110 will be able to get root access and compromise the cryptographic keys of the gateway 110 used to securely communicate with the IDE 115. If a particular gateway 110 is compromised, it must be ensured that the gateway 110 will not give an adversary privileged access to the IDE 115 or to any other gateways 110 deployed within the private network.

Compromising a single gateway 110 may result in adversaries getting access to images pushed from the IDE 115 to the target device 105 connected to the gateway 110. Additionally, the adversary may push their own images to the target device 105 or may intercept and inject serial communications or power cycle commands to the target device 105.

To mitigate these issues, the kernel of the gateway 110 may be enhanced with a hardening guide to make exploitation, particularly remote exploitation, more difficult. In addition, extensive audit logging, regular over-the-air (OTA) updates, short-lived certificates and/or certificate revocation may be implemented by the operator of the IDE.

The operator of the IDE may function as a private certificate authority (CA) for the mTLS protocol security architecture described above and issue digital certificates to the gateway devices. The operator of the IDE may implement a distinct instance of a cloud-based IDE for any number of customers, and each customer may deploy any number of target devices (and associated gateways) for testing code developed in their respective IDE instance. Thus, a key management hierarchy for the gateways is critical to a secure operation.

Figure 2:
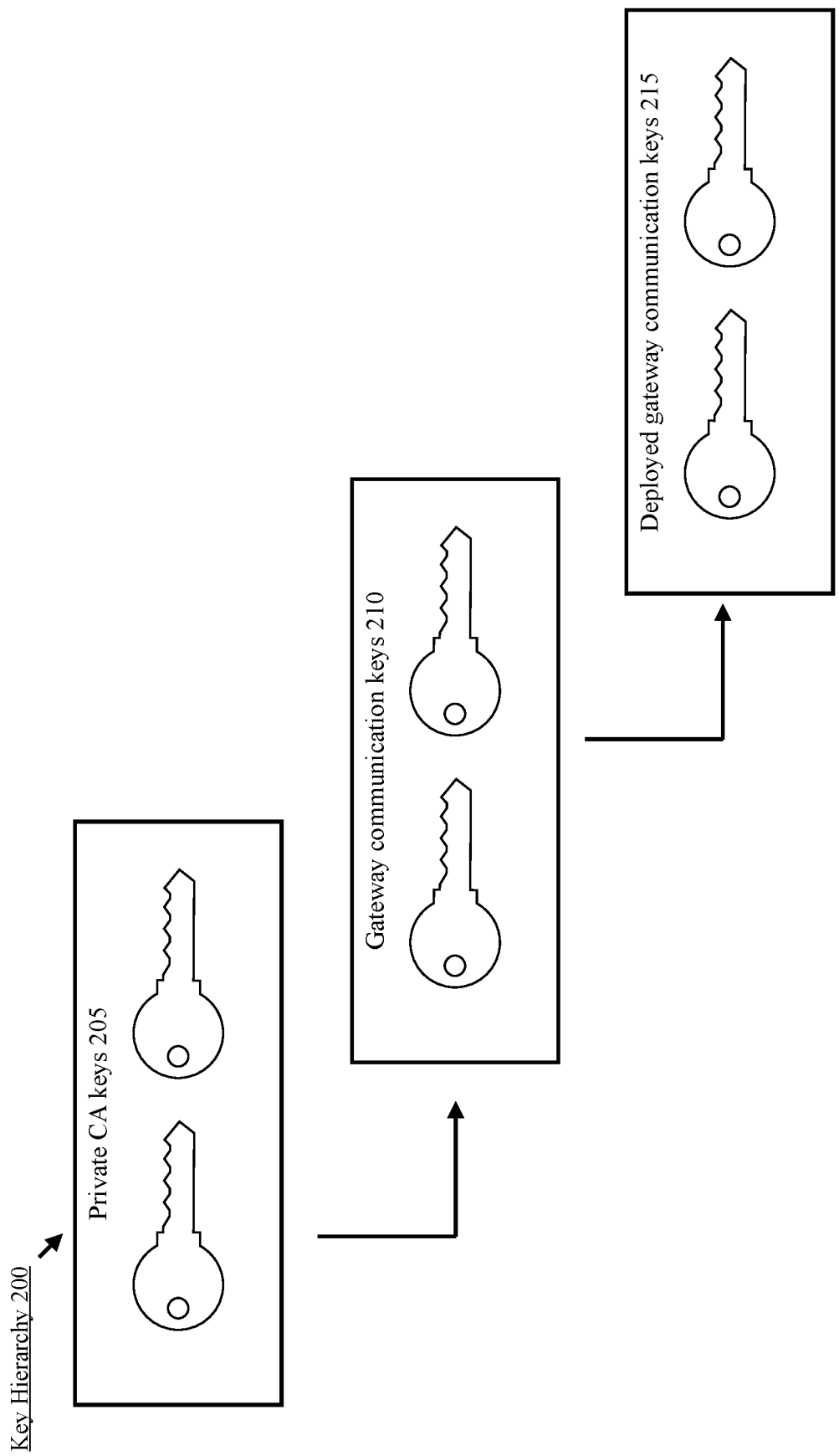
FIG. 2 shows an exemplary key hierarchy for communications in a public key cryptographic system of an IDE system.

FIG. 2 shows an exemplary key hierarchy 200 for communications in a public key cryptographic system of an IDE system. In the example of FIG. 2, the RSA cryptosystem is used, specifically RSA-4096 keys. However, other types of public key encryption may also be used.

The exemplary key hierarchy 200 includes a certificate authority (CA) possessing a private set of keys 205. That is, the private CA keys 205 are never deployed to the public. Below the private CA keys 205 is a set of gateway communications keys 210. The gateway communications keys 210 may be issued for a particular instance of the IDE. Thus, many distinct sets of gateway communications keys 210 may exist for the multiple customers of the operator of the IDE, each of the customers using an instance of the IDE. Further, below each set of gateway communications keys 210 are the deployed gateway keys 215. A deployed gateway key 215 is provisioned for each gateway used by the customer.

With the above-described key hierarchy, keys may be revoked and regenerated on a per-IDE instance basis. For example, if a particular gateway device is compromised for a particular customer, then the gateway communications key 210 can be revoked and regenerated for that customer, which will regenerate the deployed gateway keys 215 for each of the gateways operated via the IDE instance of that customer. That is, if all the deployed gateway keys 215 for a customer are to be invalidated, then the gateway communications key 210 can be invalidated, meaning everything downward is revoked.

The private CA in the above example can track the secure boot keys on each gateway device and manage/track the TLS certificates issued to the gateway devices. The private CA may determine to roll the gateway communications key 210 on the basis of per customer, per region, per time frame, or per number of gateway devices.

To provision a gateway device, a first step comprises enabling the hardware security features of the platform. For example, the gateway device may be configured to boot only OS images signed by the operator of the IDE (the private CA. The keys installed on the platform may be unique per platform.

The gateway device may be shipped by a hardware vendor to a customer without any software on it. Upon receipt, the customer may download a gateway OS image from the IDE operator to provision the gateway. A second provisioning step comprises installing the gateway OS image on the gateway device. For example, the kernel may be installed, including gateway software configured/signed to support secure boot. The gateway OS image may be built and signed by the operator of the IDE. The same gateway OS image may be used for multiple customers.

After OS installation, the customer may log into the IDE and provide some information about the gateway, for example location, access policy, etc. The IDE will generate a configuration file for the gateway that includes the private key and certificate that allow it to communicate with the IDE (the specific instance of the IDE). A third provisioning step comprises installing the communications certificate and the private key and enrolling the gateway device with the instance of the IDE.

The operator of the IDE (private CA) may manage the certificates in the various instances of the IDE. The certificates may be logged with associated information including the date created, the lifespan, a renewal date and a revocation date.

Figure 3:
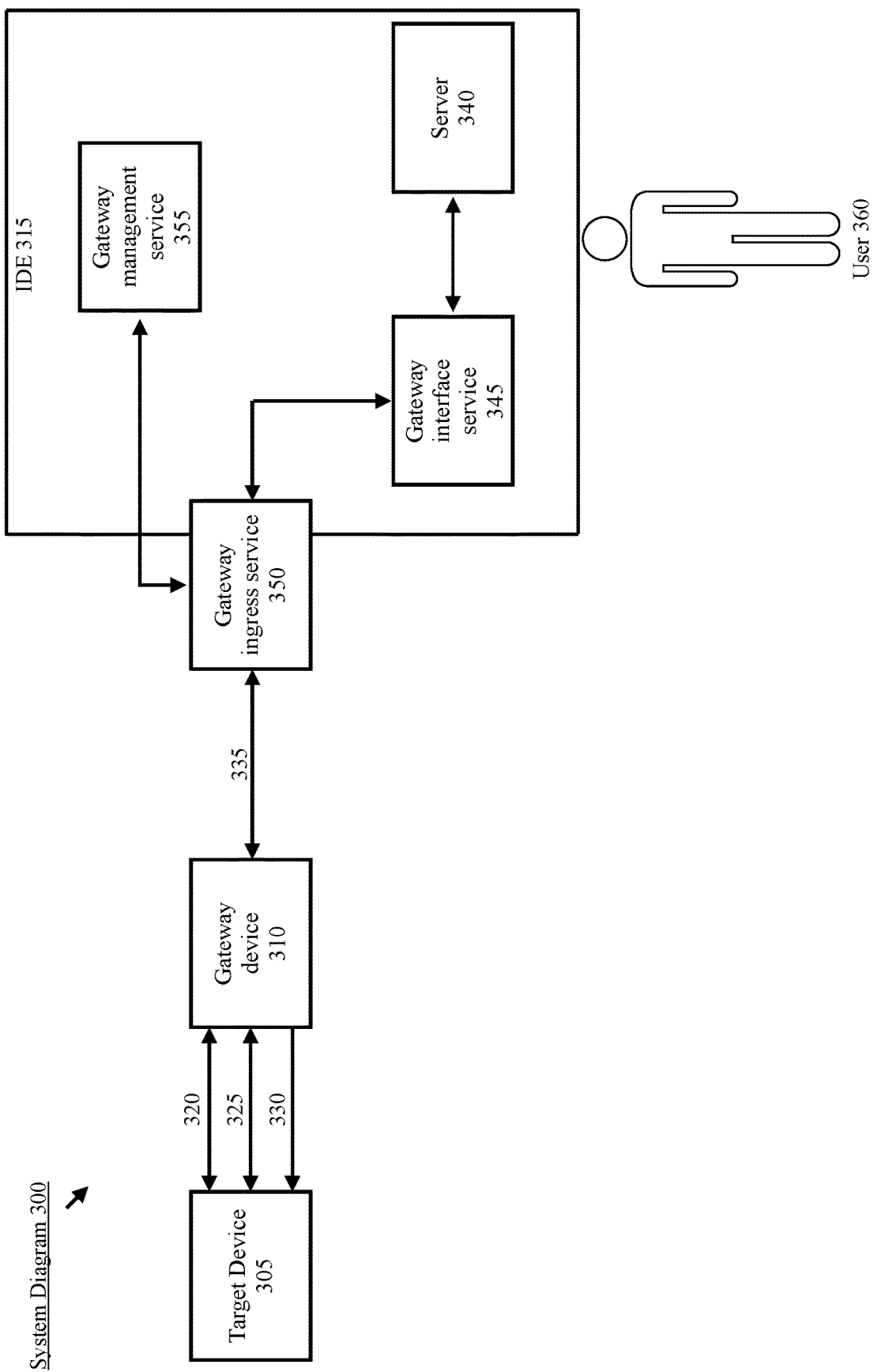
FIG. 3 shows an exemplary system diagram including an instance of a cloud-based IDE accessing a target device via a gateway device.

FIG. 3 shows an exemplary system diagram 300 including an instance of a cloud-based integrated development environment (IDE) 315 accessing a target device 305 via a gateway device 310. The system diagram 300 is similar to the system diagram 100 described above with respect to FIG. 1 but expanded to show exemplary communications pathways and internal workings of the IDE instance 315 with respect to target provisioning.

Similar to FIG. 1, the gateway 310 is equipped with circuitry to communicate with the target device 305 using an Ethernet connection 320 and with the IDE instance 315 using a network connection 335, such as the Internet. The gateway 310 is further equipped with hardware for communicating with the target device 305 via a serial connection 325 and a power relay for controlling a power flow 330 to the target device 305.

The IDE instance 315 is a cloud-based development service comprising a plurality of servers and providing a plurality of services. The IDE instance 315 includes one or more servers 340 acting as a repository for the code generated via the IDE 315. For example, multiple developers may have access to a particular application code and build the application collaboratively using a master file stored on the server 340. The server 340 may provide additional services, including providing a user application for reserving/managing development boards.

To provision a target device 305, a user of the IDE 360 (e.g., a developer) may first reserve the target device 305 for some duration of time via the server 340. The server 340 communicates with a gateway interface service 345 that provides an application to the user 360 for selecting an OS boot image for provisioning the target device 305. The user selects the boot image and the gateway interface service 345 notifies a gateway ingress service 350. The gateway ingress service 350 receives authorization information (e.g., keys, etc.) for the gateway 310 from a gateway management service 355.

The gateway ingress service 350 then authenticates the IDE 315 to the gateway 310, and the gateway 310 authenticates itself to the IDE 315. Once authenticated, the gateway 310 and the IDE 315 may perform communications over the encrypted mTLS connect 335. The gateway ingress service 350 transmits the OS boot image over the network connection 335 to the gateway 310. The gateway 310 then boots the target device 305 (TFTP boot) using the boot image over the Ethernet connection 320.

Once booted, the user 360 of the IDE 315 may securely communicate with the target device 305 via the gateway 310 to provision the target device 305 with application software and test/debug the application software, for example, by using the SSH protocol to interact with the serial console of the target device and/or to transmit application code and execution instructions to the target device 305 via the gateway 310.

The direct connections between the gateway and the target device allow for many additional functionalities for the gateway. As mentioned above, using the power connection, the target device may be power cycled and brought up from a powered off state. The gateway device 110 may power a new board, having no software previously loaded, and load the board with software, e.g., software agents to perform a variety of tasks, prior to any provisioning of the board. For example, a software agent may be deployed to perform diagnostic scans to determine the capabilities of the board. In another example, a new board may be configured for network communication functionalities, e.g., WiFi or Bluetooth. In still another example, the gateway can run a TFTP server to bootstrap the target device.

Once the target device is up and running, diagnostics may be run and the data from the diagnostic scan may be stored at the gateway for later analysis. In another example, an HDMI connection may be made between the devices so that an HDMI feed can be received off the target device. In still another example, the gateway may expose a webpage so that a user may log into the gateway and see the diagnostic data in a readable form.

For any given gateway, a security policy may be implemented based on a series of trust factors. For example, the gateway may be located in an access-controlled lab and may be accessed only while located in that lab. In another example, the gateway may be accessed only when connected to a particular corporate IP address. In still another example, the gateway may be accessed only when connected to the same IP address as the user seeking to access the gateway.

The access policy could dictate that the gateway is always authorized for use, regardless of the most recent time that a user logged into the gateway. Alternatively, it may be required that the gateway is periodically reauthorized (e.g., logged into) via a web interface or using a USB authentication key.

In another embodiment, a gateway may be integrated with the target device as software and have a reduced set of capabilities relative to the exemplary physical gateway device. For example, the gateway may perform the provisioning steps discussed above, but may not have the ability to power cycle the target device, bring the target device up from a powered off state, etc.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method performed at a gateway device, comprising:
receiving, from an integrated development environment (IDE), a system configuration for a target device including application code for execution on the target device, the configuration being received via an encrypted network connection, wherein the gateway device is configured with cryptographic keys for mutual transport layer security (mTLS) communication protocol communications with the IDE, the cryptographic keys comprising a deployed gateway key corresponding to the gateway device, wherein the deployed gateway key is one of a set of gateway communications keys issued by the IDE to an entity operating the gateway device, wherein the gateway communication keys are issued for a particular instance of the IDE and are associated with private keys of the IDE;
deploying a software agent on the target device, wherein the software agent determines one or more capabilities of the target device;
provisioning the target device with the application code;
receiving, from the IDE, instructions via the encrypted network connection to execute the application code on the remote device; and
instructing the application code to execute on the remote device.

2. The method of claim 1, wherein the operations further comprise:
receiving, from the IDE, an operating system (OS) image; and
securely booting an OS for the remote device.

3. The method of claim 2, wherein the operations further comprise:
storing the OS and the cryptographic keys in a storage.

4. The method of claim 1, wherein the operations further comprise:
receiving, from the IDE, instructions via the encrypted network connection to power cycle the target device; and
controlling a power to the target device via a power relay.

5. The method of claim 1, wherein the operations further comprise:
installing a gateway OS image received from the IDE; and
installing a configuration file including a communications certificate and cryptographic keys for communications with the IDE; and
enrolling with the IDE.

6. The method of claim 1, wherein the operations further comprise:
configuring the remote device with diagnostics code;
executing the diagnostics code to perform a diagnostics scan; and
storing the results of the diagnostics scan.

7. The method of claim 1, wherein the operations further comprise:
testing and debugging the application code based on the execution of the application code.

8. The method of claim 1, wherein provisioning the target device and instructing the application code to execute is performed via a direct serial connection between the gateway and the target device.

9. The method of claim 1, wherein the software agent determines the one or more capabilities of the target device prior to the provisioning of the target device with the application code.

10. A gateway device, comprising:
a storage device configured to store cryptographic keys for mutual transport layer security (mTLS) communication protocol communications with an integrated development environment (IDE), the cryptographic keys comprising a deployed gateway key corresponding to the gateway device, wherein the deployed gateway key is one of a set of gateway communications keys issued by the IDE to an entity operating the gateway device, wherein the gateway communication keys are issued for a particular instance of the IDE and are associated with private keys of the IDE;
a first network interface configured to receive a system configuration for a target device including application code for execution on the target device, wherein the gateway device performs the mTLS communications with the IDE using the cryptographic keys via the first network interface;
a second network interface; and
a processor coupled to a memory configured to:
determine the system configuration for the target device;
deploy a software agent on the target device, wherein the software agent determines one or more capabilities of the target device;
send provisioning information to the target device via the second network interface, wherein the provisioning information includes the application code;
receive, via the first network interface, instructions to execute the application code on the remote device; and
instruct, via the second network interface, the application code to execute on the remote device.

11. The gateway device of claim 10, wherein the processor is further configured to:
receive, via the first network interface, the OS image; and
securely boot the OS for the remote device via the second network interface.

12. The gateway device of claim 10, further comprising:
a power relay configured to connect to the target device via a power connection, wherein the processor is further configured to one of power cycle the target device or control a power to the target device via the power relay.

13. The gateway device of claim 10, wherein the second network interface comprises one or more interfaces for connecting to the target device.

14. The gateway device of claim 13, further comprising:
a direct serial connection between the gateway and the target device.

15. The gateway device of claim 10, wherein the processor is further configured to:
install a gateway OS image; and
install a configuration file including a communications certificate and cryptographic keys for communications with an integrated development environment (IDE); and
enroll with the IDE.

16. The gateway device of claim 10, wherein the processor is further configured to:
configure the remote device with diagnostics code;
execute the diagnostics code to perform a diagnostics scan; and
store the results of the diagnostics scan.

17. The gateway device of claim 10, wherein the processor is further configured to:
   test the application code based on the execution of the application code; and
   store test results based on the execution of the application code.

\* \* \* \* \*